United States Patent Office

2,793,241
Patented May 21, 1957

2,793,241

CONVERSION OF METHANOL TO HYDROCARBONS WITH METALLIC COBALT CATALYSTS

Frank S. Fawcett, Wilmington, Del., and Benjamin W. Howk, West Chester, Pa., assignors to E. I. du Pont de Nemours & Company, Wilmington, Del., a corporation of Delaware No Drawing. Application January 30, 1953,
Serial No. 334,375

8 Claims. (Cl. 260—682)

This invention relates to a catalytic process for preparing hydrocarbons.

It is known to effect thermal control in the conversion of oxides of carbon to hydrocarbons containing more than one carbon atom per molecule by hydrogenation over Group VIII metals, or compounds of such metals, by effecting the reaction in the presence of an alkanol, especially methanol and ethanol.

It has now been found that valuable essentially hydrocarbon products can be obtained by contacting methanol alone with an elementary cobalt catalyst (i. e. a catalyst containing elementary cobalt) at an elevated temperature and pressure. In accord with the process of this invention a hydrocarbon wax is prepared by introducing methanol and an elementary cobalt catalyst into a pressure-resistant reaction vessel, heating the said methanol and catalyst under superatmospheric pressure without addition of any other reactant at a reaction temperature within the range of 100° to 350° C., continuing said heating until the said methanol is converted, at least in part, to an essentially hydrocarbon wax, and thereafter separating the said wax from the resulting mixture.

This invention accordingly provides a simple method for obtaining valuable hydrocarbon products from methanol in good yield and with good thermal control.

In one practical embodiment, a pressure reactor, previously flushed with oxygen-free nitrogen, is charged with methanol and an elementary cobalt catalyst. The reactor is thoroughly cooled, evacuated, then closed. The charge is thereafter heated to between 100° and 350° C. for from 2 to 24 hours under superatmospheric pressure, which may be autogenously developed. The reactor is permitted to cool, after which it is opened, and the contents discharged, and filtered. The solid, consisting of catalyst together with undissolved normally solid hydrocarbons, is extracted with a suitable solvent such as benzene or xylene to recover the solid hydrocarbons. The filtrate is then processed to separate liquid and soluble solid hydrocarbon products from unreacted methanol by methods well known to those skilled in the art.

The examples which follow are submitted to illustrate and not to limit this invention. The pressure vessel employed had a capacity of approximately 400 cc.

Example I

A pressure vessel, previously swept out with oxygen-free nitrogen, was charged with 300 cc. of methanol and 20 g. of reduced cobalt oxide catalyst. The vessel was closed and heated at 200° C. under autogenous pressure for 15 hours, cooled, and the product removed. White particles of wax were present in suspension in the crude reaction mixture. The mixture was filtered and the solid, on extraction with benzene, gave 3.04 g. of solid hydrocarbon wax. Further extraction with xylene gave 0.1 g. of hydrocarbon polymer.

The reduced cobalt oxide catalyst was prepared by reducing cobalt oxide in an atmosphere of hydrogen at 400° C. for 24 hours and storing the resulting catalyst in an atmosphere of nitrogen.

Example II

A reaction vessel was flushed with nitrogen and charged with 300 cc. of methanol and 20 g. of reduced cobalt oxide catalyst. The reaction mixture was then heated at 225° C. for 15 hours, during which time a pressure of 200 atmospheres developed. On cooling and opening the reaction vessel, there were observed lumps of wax suspended in the crude reaction product. The catalyst and wax were isolated by filtration and the mixture extracted with benzene to remove wax. There was isolated from the benzene extract 12.5 g. of solid wax, molecular weight 310.

Four experiments like the above were carried out and the products were combined for working up. There was obtained 37.3 g. of a hydrocarbon mixture which in the aggregate was a solid wax. A benzene solution of the composite when diluted with methanol deposited 9.33 g. of white solid, M. P. 53–106° C., mol. wt. 625 (Anal. C, 83.80; H, 14.49). Distillation of the remainder of the product with a molecular type still yielded 9 g. of liquid, $n_D^{25}$ 1.4290–1.4311 (Anal. C, 84.68; H, 14.88) and 10 g. of a mixture of solid and liquid, mol. wt. 260 (Anal. C, 84.88; H, 14.79). The residue of 6 g. melted at 45–61° C. and had a molecular weight of 364 (Anal. C, 85.72; H, 14.80).

Example III

A mixture of 300 cc. of methanol and 20 g. of reduced cobalt oxide catalyst was heated with agitation in a closed pressure vessel for 15 hours at 250° C., during which time a pressure of 655–720 atmospheres developed. The crude reaction product consisted of two liquid layers containing lumps of wax and catalyst. The organic layer was separated by extraction with benzene. After removal of the benzene by distillation there was obtained 15.6 g. of liquid containing suspended wax. A benzene solution of the crude product on dilution with methanol precipitated 1.6 g. of solid hydrocarbon, M. P. 51–59° C. Extraction of the catalyst with benzene gave an additional 2.3 g. of white wax, M. P. 45–90° C., and 2.0 g. of wax which was semi-solid at room temperature, making a total of 19.9 g. of hydrocarbon product.

Example IV

A mixture of 300 cc. of methanol and 20 g. of reduced cobalt oxide catalyst was charged into a pressure vessel filled with nitrogen. The mixture was heated with agitation for 4 hours at 250° C., during which time a maximum pressure of 355 atmospheres developed. The crude reaction mixture was filtered, and the unreacted methanol was separated from the filtrate by distillation, leaving a residue which on extraction with benzene yielded 8.5 g. of solid wax. The solid separated in the original filtration, when extracted with benzene, yielded an additional 0.5 g. of solid wax.

Example V

A mixture of 200 cc. of methanol, 100 cc. of benzene and 20 g. of reduced cobalt oxide catalyst was agitated in a closed reactor under autogenous pressure at 200° C. for 15 hours. After cooling, the reaction vessel was opened and the contents filtered. Unreacted methanol and benzene were distilled from the filtrate, and a residue of 0.84 g. of solid wax was obtained.

Example VI

A mixture of 300 cc. of methanol and 15 g. of alloy-skeleton cobalt catalyst paste (prepared by leaching an aluminum-cobalt alloy with sodium hydroxide, washing with ethanol, and pasting with ethanol), was charged to a pressure vessel and heated at 250° C. for 15 hours, during which time a pressure of 850 atmospheres developed. The crude reaction mixture was filtered and washed successively on the filter with methanol and benzene. The combined filtrate and washings consisted of two layers. The lower layer was extracted with benzene, the extract combined with the upper layer, and the resulting mixture distilled. There was obtained 4.2 g. of liquid distillate, B. P. 100°–176° C., $n_D^{25}$—1.4002–1.4131, and 8.0 g. of residue, $n_D^{25}$—1.4269, which deposited a waxy solid on cooling to room temperature.

The above experiment was repeated using 300 cc. of methanol and 5 g. of alloy-skeleton cobalt catalyst at 200° C., under which conditions a pressure of 65 atmospheres developed. Filtration and distillation of the filtrate yielded 1.0 g. of solid wax residue.

*Example VII*

A mixture of 300 cc. of methanol and 10 g. of cobalt-manganese-kieselguhr catalyst was processed at 250° C. for 15 hours, during which time an autogenous pressure of 270 atmospheres developed. The crude reaction product contained lumps of soft wax which were separated mechanically and extracted with benzene in a Soxhlet apparatus. The benzene solution of the wax on dilution with methanol yielded 4.8 g. of a white solid wax, M. P. 37°–90° C.

Anal. C, 84.17; H, 14.54; mol. wt. 460–470; inherent viscosity (0.1% in tetralin at 125° C.), 0.06.

The filtrate obtained in separating this wax yielded 6.3 g. of oil which froze at approximately 19–23° C.

Anal. C, 85.04; H, 14.97; mol. wt. 255, 262.

The above experiment was repeated and the crude mixture of liquid and suspended solid was extracted with benzene at room temperature yielding 11.6 g. of a soft white wax.

Anal. C, 83.87; H, 14.83; mol. wt. 240, 241; hydroxyl No. 19.6, 18.4.

The cobalt-manganese kieselguhr catalyst was prepared by the following procedure:

Twenty-five grams of Co and 3.75 g. of Mn in the form of their nitrates were dissolved in 500 cc. water and heated to boiling. The boiling solution was added under very vigorous stirring to a solution containing 61 g. of sodium carbonate in 750 cc. of water, likewise heated to boiling. Immediately after the resultant precipitation of carbonates, 3.5 g. of kieselguhr (previously extracted with $HNO_3$ and calcined at 800° C.) was stirred into the hot slurry. The slurry was filtered while hot and washed twice by re-slurrying with hot distilled water. The final filter cake was dried in an oven for 27 hours at 70° C.

The dried material was reduced with 3:1 hydrogen: nitrogen gas at a space velocity of 6000 hr.-1 at 400° C. for 1 hour and stored in an atmosphere of nitrogen.

*Example VIII*

A mixture of 300 cc. of methanol and 20 g. of a commerical cobalt-thoria catalyst was heated at 250° C. for 15 hours, during which time a pressure of 800 atmospheres developed. The crude reaction product consisted of two liquid phases plus some lumps of soft wax. Distillation of the hydrocarbon fraction, which amounted to 15.6 g., yielded a distillate portion of 45% boiling point below 150° C. and a residue of 55% which boiled above 150° C.

Residue: Anal. C, 84.16; H, 14.86; mol wt., 183, 188; hydroxyl number, 20.3 iodine number, 29.0. The distillate boiling below 150° C. showed an iodine number of 36–39. Extraction of the catalyst with benzene gave an additional 0.5 g. of soft wax.

The above experiment was repeated and there was obtained 16 g. of crude oil layer and, on extraction of the catalyst, 0.6 g. of wax.

The examples have illustrated preferred embodiments and they are not, therefore, to be construed as limiting this invention.

Any elementary cobalt catalyst may be used in the practice of this invention. The type and amount of cobalt catalyst may be varied considerably. Pyrophoric or stabilized cobalt catalysts either in the massive state, as pellets, or as fine powders are effective. These catalysts may be promoted or extended on supports. Suitable promoters are manganese, thoria, etc., and suitable extenders are kieselguhr, alumina, silica, carbon, magnesia, fuller's earth, etc. Such catalysts may be prepared by the hydrogen reduction of cobalt compounds such as the carbonate, oxide, or hydroxide, or by extraction with alkali wholly, or in part, the alkali soluble component of an alloy of cobalt with an alkali soluble metal, as described in U. S. 1,628,190, or by reducing a cobalt salt with sodium naphthalene as described in U. S. 2,177,412. Stabilized cobalt catalysts may be prepared by exposure of pyrophoric cobalt to an oxidizing atmosphere, while maintaining the catalyst mass at a temperature below 50° C. Supported cobalt catalysts may be prepared by adding the supporting material during the catalyst preparation, or by forming the support coincidentally with the catalyst, and promoted cobalt catalysts by co-precipitation as illustrated in Example VII.

In general, the amount of catalyst is such as to provide at least 3% cobalt by weight of the methanol present. No practical advantages accrue from the use of more than 15% cobalt by weight of the methanol and this therefore constitutes a practical upper limit. The best results are obtained when the amount of cobalt is from 7 to 10% by weight of the methanol and this therefore constitutes the catalyst concentration most generally used.

In a continuous flow process, the alcohol under pressure is passed over a stationary bed of catalyst at such a rate as to permit sufficient time of contact with the catalyst to bring about the desired reaction. Alternatively, a slurry of the catalyst in the methanol can be circulated through a heated chamber at such rate as to bring about the desired reaction.

The process of this invention can be carried out at temperatures of from 100° to 350° C., but since best results from the standpoint of hydrocarbon production, of desired molecular weight distribution, are obtained in the range of 150° to 275° C., this embraces the temperature conditions most generally used.

The time of reaction varies over wide limits and depends upon the temperature and pressure conditions used, activity of the cobalt catalyst, and mode of operation. In general, the time of reaction is between 2 and 24 hours. As Example V illustrates, the reaction may be effected in the presence of adjuvants, e. g. benzene and the like.

In batch operation the pressure may be that developed under the temperature conditions used. Pressures which can be readily developed in this manner are within the range of 65 to 1000 atmospheres. Suitably, these pressures can be as low as 65 atmospheres, at the lower temperatures which are usefully employable, up to 900 atmospheres or more at the higher temperatures. In a continuous flow process, the pressure can be controlled within the indicated range by known methods. It is permissible to provide pressures within the said operable range by applying pressure externally or by partially relieving autogenously developed pressures, in batch or continuous processes.

The process of this invention provides a practical route to valuable hydrocarbons directly from methanol. The hydrocarbons vary from liquid products useful as fuels and lubricants to high molecular weight, normally solid, tough products which find utility as plastics, waxes for coatings, polishes, and the like.

We claim:

1. A process for preparing hydrocarbon wax which comprises introducing methanol into a pressure-resistant reaction vessel, heating the said methanol under superatmospheric pressure without addition of any other reactant at a reaction temperature within the range of 100° to 350° C. in the presence of a catalyst containing elementary cobalt, at a pressure of at least 65 atmospheres, continuing said heating until the said methanol is converted, at least in part, to an essentially hydrocarbon wax, and thereafter separating the said wax from the resulting mixture.

2. A process for preparing a normally solid hydrocarbon wax which comprises introducing methanol into a pressure-resistant reaction vessel, heating the said methanol under superatmospheric pressure without addition of any other reactant at a reaction temperature within the range of 150° to 275° C. in the presence of a catalyst containing elementary cobalt, at a pressure of at least 65 atmospheres, continuing said heating until the said methanol is converted, at least in part, to a normally solid essentially hydrocarbon wax, and thereafter separating the said wax from the resulting mixture.

3. A process for preparing a normally solid hydrocarbon wax which comprises introducing methanol into a pressure-resistant reaction vessel, heating the said methanol under a pressure within the range of from 65 to 1000 atmospheres without addition of any other reactant at a reaction temperature within the range of 100° to 350° C. in the presence of a catalyst containing elementary cobalt, continuing said heating until the said methanol is converted, at least in part, to a normally solid essentially hydrocarbon wax, and thereafter separating the said wax from the resulting mixture.

4. Process of claim 3 wherein the time at the said reaction temperature is from 2 to 24 hours.

5. Process of claim 4 wherein the quantity of the said elementary cobalt is from 3% to 15% of the weight of methanol present.

6. Process of claim 4 wherein the cobalt is in the form of skeletal cobalt prepared by leaching an aluminum-cobalt alloy with sodium hydroxide.

7. Process of claim 4 wherein the cobalt is in the form of cobalt-manganese-kieselguhr.

8. Process of claim 4 wherein the cobalt is in the form of cobalt-thoria.

References Cited in the file of this patent

UNITED STATES PATENTS 2,181,640     Deanesly et al.  ---------- Nov. 28, 1939

OTHER REFERENCES

Storch et al.: "The Fischer-Tropsch and Related Syntheses," published by Wiley and Sons, Inc., New York, 1951, page 590.